US009829724B1

(12) United States Patent
Perricone et al.

(10) Patent No.: US 9,829,724 B1
(45) Date of Patent: Nov. 28, 2017

(54) SPECTRALLY FILTERED EYEWEAR

(71) Applicant: Perriquest Defense Research Enterprises, LLC, Meriden, CT (US)

(72) Inventors: Nicholas V. Perricone, Meriden, CT (US); Kristin A. Rauschenbach, Franconia, NH (US); Jennifer D. Traylor Kruschwitz, Rochester, NY (US)

(73) Assignee: PerriQuest Defense Research Enterprises, LLC, Meriden, CT (US)

( * ) Notice: Subject to any disclaimer, the term of this patent is extended or adjusted under 35 U.S.C. 154(b) by 39 days.

(21) Appl. No.: 14/946,633

(22) Filed: Nov. 19, 2015

Related U.S. Application Data

(60) Provisional application No. 62/085,577, filed on Nov. 30, 2014.

(51) Int. Cl.
G02C 7/10 (2006.01)
G02C 7/04 (2006.01)

(52) U.S. Cl.
CPC ............. *G02C 7/107* (2013.01); *G02C 7/049* (2013.01); *G02C 7/10* (2013.01); *G02C 7/104* (2013.01); *G02C 2202/16* (2013.01)

(58) Field of Classification Search
CPC .......... G02C 7/107; G02C 7/104; G02C 7/10; G02C 7/049
USPC ............ 351/159.29, 159.27, 159.24, 159.02, 351/159.01, 159.3, 159.32, 159.56, 351/159.62, 159.65, 159.66; 359/630, 359/880, 887, 890, 891
See application file for complete search history.

(56) References Cited

U.S. PATENT DOCUMENTS

| 4,848,894 A * | 7/1989 | Buser ................. G02B 5/32 351/159.29 |
| 8,023,195 B2 | 9/2011 | Popov et al. |
| 9,134,547 B2 * | 9/2015 | McCabe .............. G02C 7/104 |
| 9,383,594 B2 * | 7/2016 | McCabe .............. G02C 7/104 |
| 2005/0024583 A1 | 2/2005 | Neuberger |

(Continued)

OTHER PUBLICATIONS

"Notification of Transmittal of the International Search Report and the Written Opinion of the International Searching Authority, or the Declaration" for PCT/US2015/061692, dated Mar. 4, 2016, 12 pages, International Searching Authority/KR, Korean Intellectual Property Office, Daejeon, Republic of Korea.

(Continued)

*Primary Examiner* — William R Alexander
(74) *Attorney, Agent, or Firm* — Kurt Rauschenbach; Rauschenbach Patent Law Group. LLC

(57) ABSTRACT

A laser protection lens includes a multilayer interference coating applied to at least one of an inside and an outside surface of an optically transparent material. The multilayer interference coating has a spectral filter profile with at least a 20 dB reduction of optical transmission for at least two different center wavelengths of lasers, while having a transmittance color difference greater than 40 $\Delta E_{Y_{u'v'}}$ for discrimination color difference of red, green, and yellow indicator lights, and having spectral transmittance that passes light detected by l-cones of an eye, while attenuating light detected by m-cones and s-cones of the eye so as to improve visual acuity.

71 Claims, 7 Drawing Sheets

(56) References Cited

U.S. PATENT DOCUMENTS

| | | | | |
|---|---|---|---|---|
| 2006/0039070 | A1* | 2/2006 | Sugimura | G02B 5/305 |
| | | | | 359/487.02 |
| 2008/0221674 | A1* | 9/2008 | Blum | G02C 7/04 |
| | | | | 623/5.11 |
| 2010/0110370 | A1 | 5/2010 | Krieg-Kowald et al. | |
| 2012/0008217 | A1* | 1/2012 | Ishak | A61F 2/1613 |
| | | | | 359/722 |
| 2013/0278893 | A1 | 10/2013 | Lemay et al. | |
| 2014/0233105 | A1* | 8/2014 | Schmeder | G01J 3/465 |
| | | | | 359/590 |
| 2015/0092053 | A1* | 4/2015 | Sullivan | G02B 5/26 |
| | | | | 348/143 |
| 2015/0338683 | A1* | 11/2015 | Perricone | G02B 1/041 |
| | | | | 351/49 |

OTHER PUBLICATIONS

Dykes, Jim, Psychophysical Test of Contrast Acuity to Aid Operational Effectiveness of Aircrew Laser Eye Protection (LEP), Texas Univ at San Antonio, Fianl rept, Aug. 2005, <Retrieve: https://www.researchgate.net/publication/235176065_PsychophysicaT_Test_of Contrast_Acuity_to_Aid_Operational_Effectiveness_of Aircrew_Laser_Eye_Protection_LEP>.

Notification Concerning Transmittal of International Preliminary Report on Patentability (Chapter I of the Patent Cooperation Treaty), for International Application No. PCT/US152015/061692, Jun. 15, 2017, 9 pages, The International Bureau of WIPO, Geneva, Switzerland.

Flight Crew Training Manual, 2002, 389 pages, Airbus.

American National Standard for Safe Use of Lasers, Mar. 16, 2007, 22 pages, Orlando Florida, Laser Institute of America.

Aeronautical Lighting and Other Airport Visual Aids, Aug. 22, 2013, pp. 1-23 , Chapter 2., www.faa.gov/air_traffic/publications/atpubs/aim/aim0201.html/ retrieved Jan. 21, 2014.

Donval, et al., Anti-Dazzling Protection for Air-Force Pilots, Proc. of SPIE, 2002 pp. 83530L-1-83530L-6, vol. 8353, Infrared Technology and Applications XXV111, SPIE.

Eigenmann, et al., New Developments in Ophtalmic Coatings on Plastic Lenses, p. 9-14, vol. 3175.SPIE.

Friz, et al., Coating Materials, pp. 105-130.

Gvozden, et al., Possibilities of Adjusting the Light Characteristics of Illuminating Devices Based on White and Colored LEDs, J. Opt Technol., Jul. 2010, pp. 442-446, vol. 77, Optical Society of America.

Hou, et al., Ultra-Bright Heads-Up Displays Using a Method of Projected Color Images by Combination of LEDs and Polymer-Dispersed Liquid Crystals, Journal of Display Technology, Mar. 2014, pp. 228-234, vol. 10, No. 3, IEEE.

Rea, A Second Kind of Light, Oct. 2006, pp. 34-39, Denins Guyon, Lighting Research Center, OPN.

Ritt, et al., Research on Laser Protection—An Overview of 20 Years of Activities at Fraunhofer IOSB, Electro-Optical and Infrared Systems: Technology and Applications X, 2013, pp. 88960G-1-88960G-15, vol. 8896, Proc. of SPIE.

Aerospace Recommended Practice, pp. 1-14, SAE Subcommittee A-20A/C, Crew Station & Interior Lighting of Committee A-20, Aircraft Lighting.

Seime,et al., Colorimetric Characterization of LCD and DLP Projection Displays, 2003, pp. 349-358, Society for Information Display.

Svensson, et al. Countering Laser Pointer Threats to Road Safety, Jul. 2002, pp. 640207-1-640207-8, vol. 6402, Optics and Photonics for Counterterrorism and Crime Fighting, Proc. of SPIE.

Zukauskas, et al., Optimization of Solid-State Lamps for Photobiologically Friendly Mesopic Lighting, Dec. 10, 2012, pp. 8423-8432, vol. 51, No. 35, Applied Optics, Optical Society of America.

Wyszecky, et al., Color Science: Concepts and Methods, Quantitative Data and Formulas, 2000, 2nd Edition, pp. 164-169, and 825-830, John Wiley & Sons, Inc. New York.

http://www.faa.gov/about/initiatives/lasers/, 7 pages, retrieved: Mar. 26, 2017.

* cited by examiner

| LASER | WAVELENGTH | POWER |
|---|---|---|
| RED | 635 nm | 0.75 W |
| BLUE | 445 nm | 2.0 W |
| GREEN | 532 nm | 0.5 W |

FIG. 1 (Prior Art)

SPECTRALLY FILTERED EYEWEAR

RELATED APPLICATION SECTION

The present application is a non-provisional application of U.S. Provisional Application Ser. No. 62/085,577, filed on Nov. 30, 2014, entitled "Spectrally Filtered Eyewear". The entire contents of U.S. Provisional Patent Application No. 62/085,577 are herein incorporated by reference.

The section headings used herein are for organizational purposes only and should not to be construed as limiting the subject matter described in the present application in any way.

INTRODUCTION

Rapid advances in solid-state laser technology are providing inexpensive commercially available high-power laser devices that are packaged in both hand-held and portable enclosures. Lasers with output powers in the 1-Watt-range have a nominal "ocular hazard distance" that is typically around 100 meters. The term "ocular hazard distance" is the distance at which the maximal permissible eye exposure is reached and is defined by the American National Standards Institute (ANSI). The "ocular hazard distance" is generally dependent on the divergence of the laser and the output power. See ANSI-Z136_1. It is possible for someone flash a hand-held or portable laser device to produce dangerous "laser dazzle" from great distances with these laser devices where the person is difficult or impossible to detect. The term "laser dazzle" is defined herein to mean a laser illumination event experienced by a victim directly, or indirectly via a reflection, which causes a visual distraction or temporary blindness. Laser dazzle has been reported against numerous public safety workers, transportation workers, and athletes.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. In the drawings, like reference characters generally refer to like features and structural elements throughout the various figures. The drawings are not intended to limit the scope of the Applicants' teaching in any way.

FIG. 1 illustrates a table of wavelength and powers available in prior art commercial high-power hand-held laser devices.

DESCRIPTION OF VARIOUS EMBODIMENTS

Figure 2:
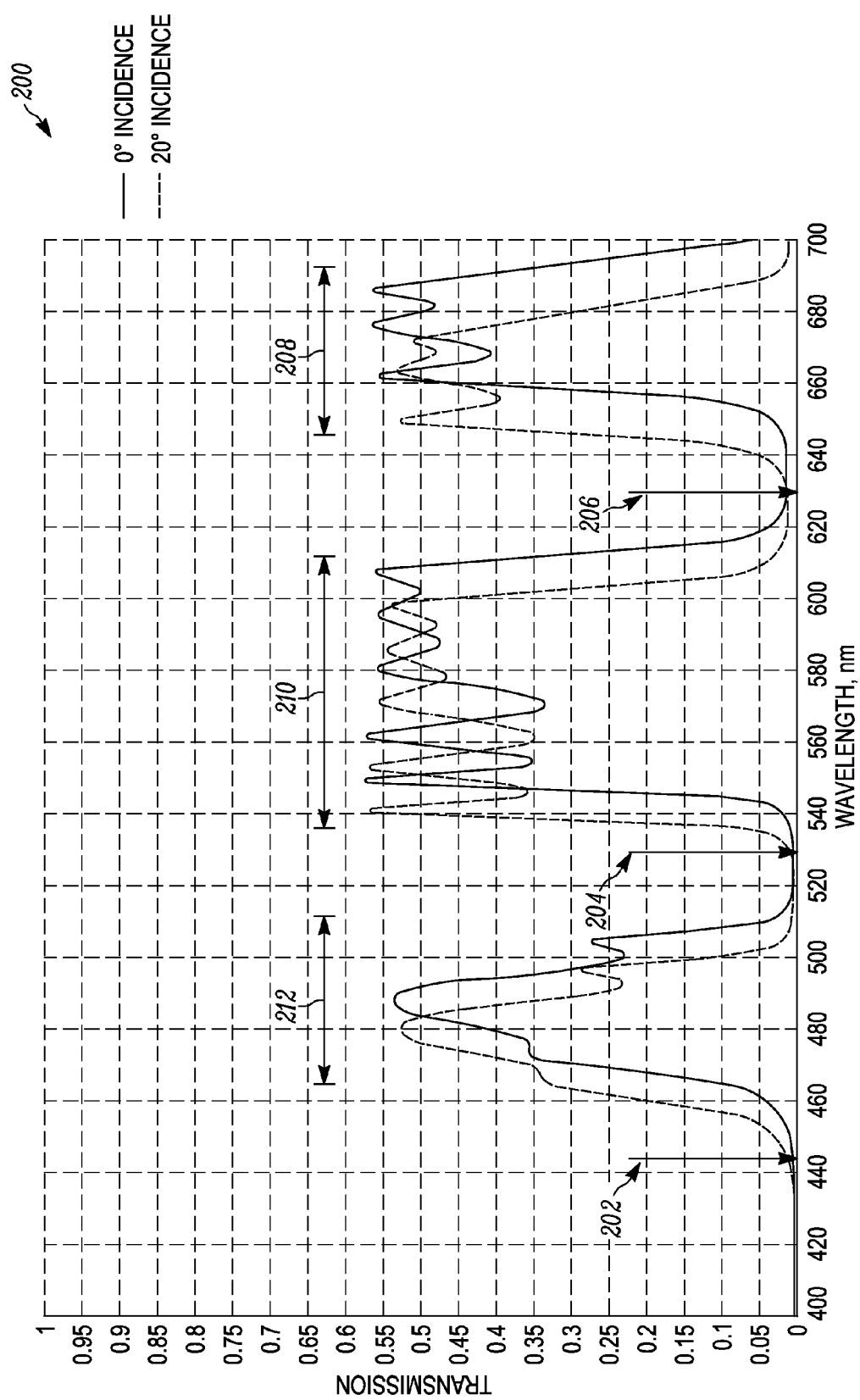
FIG. 2 illustrates a linear-scale transmission plot of a multilayer interference filter according to the present teaching that will block specific laser wavelengths.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

There is a significant need for laser protection eyewear for professionals in the transportation, public safety and athletic fields that is stylish, comfortable, and does not interfere with the individual's vision or color perception that is required to perform on the job or athletic event at a high level. Details regarding the state-of the-art for laser protection eyewear were provided in U.S. Provisional Application No. 62/001, 670 "Laser Protection Eyewear," which is incorporated herein by reference.

Conventional laser protection eyewear solutions typically rely on eyewear in the form of goggles, glasses, or visors that provide greater than optical density 2 (OD2) blocking of the laser wavelength. An optical density two means a reduction of the optical power at the laser wavelength of two orders of magnitude, which is a factor of one hundred reduction in optical laser power, or, equivalently, a 20 dB reduction in optical power. State-of-the-art laser protection eyewear for consumer and laboratory uses are largely based on passive optical filtering using color-dye-infused or coated plastic lenses. The advantage of the color-dye-infused or coated-lens approach is that it is relatively easily and inexpensive to manufacture. However, one significant disadvantage of these dye-based absorbers is that they have particularly wide wavelength blocking regions, and thus exhibit significant reductions in visible light transmission. Furthermore, the large spectral blocking causes significant colorization of the lenses. Specifically, these lenses exhibit pronounced red, yellow, blue, green, or brown colors. As a result, color discrimination for normal viewing is severely disrupted. It has been shown that long-term use of such laser safety glasses affects color balance of vision after use owing to persistence in color perception of the human eye.

There is a significant and growing need in the industry for a consumer-grade, long-term-wearable, laser protection eyewear solution that provides full laser protection in the form of optical blocking of the laser light from handheld laser and laser pointer illumination sources, with none of the significant disadvantages of the current art. The present teaching relates generally to providing such consumer-grade laser protection eyewear.

The laser protection eyewear of the current teaching uses multilayer interference filters that are applied to various surfaces of the eyewear lens, as described in, for example, U.S. Provisional Application No. 62/001,670 entitled "Laser Protection Eyewear," which is incorporated herein by reference. One aspect of the present teaching is that the laser protection eyewear described herein provides good visibility and color balance, while maintaining the common features of style and practicality expected from traditional high quality eyewear. In various embodiments, the laser protection eyewear according to the present teaching filters particular wavelengths of light from available, and soon-to-be-available, hand-held and portable laser devices to an eye-safe and non-distracting, power level.

One aspect of the laser protection eyewear of the present teaching is that the eyewear can be shaped to block laser light propagating at various angles of incidence for specific use applications, such as aircraft take off and landing. Some embodiments of the laser protection eyewear frames according to the present teaching fix the protective lenses to the user's head with various frames, head gear, or visor apparatus in a manner where the protective lenses are comfortable and wearable for long periods of time. Other embodiments of the laser protection eyewear of the present teaching take the form of a hard or soft contact lens. The term "User," as defined herein, includes any person or animal, such as a service dog, wearing laser protection eyewear to protect the person or animal against incident laser light.

Another aspect of the present teaching is that specific applications, such as aviation and some public safety and law enforcement applications, require laser protection eyewear that will not significantly impair the ability of the user to view instrumentation and informational lighting, including cockpit instrumentation panel lights, heads-up displays, and lighting for navigation and signage that is external to the vehicle. Many embodiments of the laser protection eyewear of the present teaching are specifically engineered so that they do not hamper the ability of the user to see common instrument displays, including handheld devices, computer monitors, and video screens. Many embodiments of the laser protection eyewear of the present teaching are also specifically engineered so that they do not affect the color discrimination of a user viewing common display units, including handheld devices, such as handheld instruments and smart phones, computer monitors, and video screens. In these embodiments, the spectral profile of the filters can be specifically designed to maintain acceptable color balance for specific viewing purposes, such as safety and navigation.

Another aspect of the laser protection eyewear of the present teaching is that various embodiments of the eyewear of the present teaching can provide blocking of laser light incident over sufficiently large angles with respect to the normal of the surface of the eyewear that it can block light from many different illumination source positions. Yet another aspect of the laser protection eyewear of the present teaching is that various embodiments of the laser protection eyewear exhibit transmission through the lens that is sufficient for evening and nighttime use. In some specific embodiments, the lens color of various embodiments of the present teaching, as viewed from the exterior of the front face of the lens, includes a yellow or amber hue. In various other embodiments, other popular colors as viewed from the exterior of the front face of the lens are incorporated into the design of the filters applied to the lenses.

Yet another aspect of the laser protection eyewear of the present teaching is that the lenses have sufficiently low interior reflection so as to limit distraction from light sources behind the user's head. In many embodiments, the lens has sufficient color uniformity so as not to cause one eye to perceive substantially different color than the other eye, which can lead to undesirable and potentially dangerous stereoscopic visual effects for the user.

High power handheld and portable lasers are of particular concern to pilots and law enforcement as well as athletes. Laser protection eyewear according to some embodiments of the present teaching block specific wavelengths associated with these high-power handheld laser devices such as those available from Wicked Lasers (www.wickedlasers.com) a company located at 10/F 132 Nathan Road, Tsim Sha Tsui, Kowloon, Hong Kong. Although Wicked Lasers has announced that they will no longer sell high power lasers to the general public in United States in 2015, there are many thousands of these high power laser devices in the general population of the United States and they will continue to be sold in many foreign countries.

FIG. 1 illustrates a table that lists the laser wavelengths and associated output power emitted from high-power commercially available handheld lasers manufactured by Wicked Lasers. The red laser operates at 635-nm wavelength and emits 0.75 Watts of maximum output power. The blue laser operates at 445-nm wavelength and emits 2 Watts of power, and the green laser operates at 532-nm wavelength and emits 0.5 Watts of power.

FIG. 2 illustrates a linear-scale transmission plot of a multilayer interference filter according to the present teaching that will block specific laser wavelengths. The transmission is illustrated at two incident angles for incoming light, 0 degrees and 20 degrees as measured from the normal to the surface of the lens. FIG. 2 shows that the spectral profile shifts towards shorter wavelengths at increasing angles of incidence. In various embodiments, a multilayer filter is applied to the front or back side of eyewear lenses according to the present teaching to realize the desired spectral transmission profile. The filter provides low transmission, or, equivalently, high blocking, at three particular laser wavelengths of interest, 445 nm 202, 532 nm 204, and 635 nm 206. The spectral transmission profile provides regions in the visible spectrum with high transmission in the red 208, yellow/green 210, and blue 212 regions of the spectrum. High transmission in these regions of the spectrum provides good visibility and color balance for the eyewear user.

Figure 3:
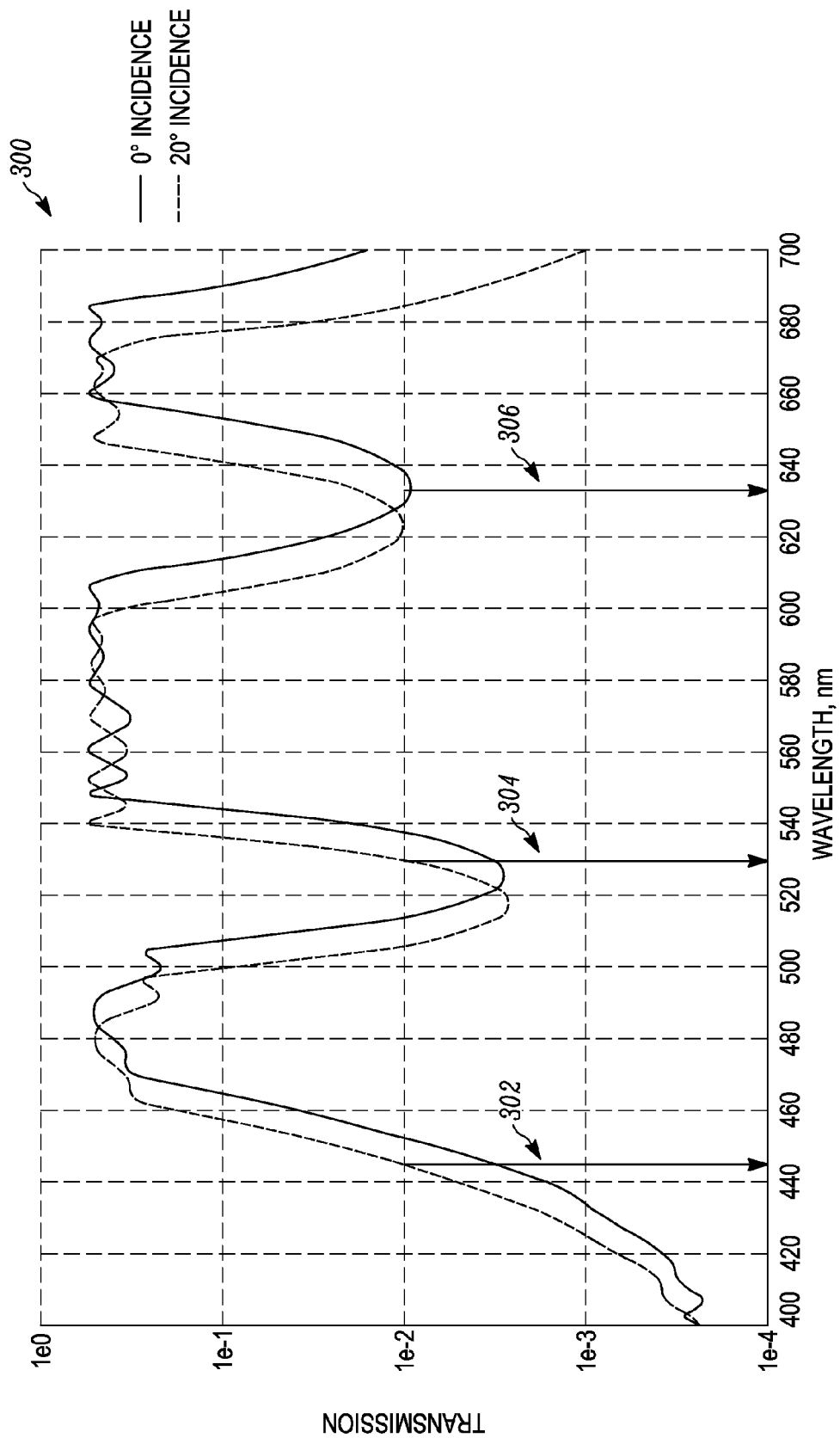
FIG. 3 illustrates a log-scale plot of the transmission of a multilayer interference filter of the present teaching that will block specific laser wavelengths with OD2.

FIG. 3 illustrates a log-scale plot of the transmission of a multilayer interference filter of the present teaching that will block specific laser wavelengths with OD2. Plots are shown for incoming light angles of incidence of zero and twenty degrees as measured from the normal to the surface of the lens. The transmission at the three wavelengths of interest 445 nm 302, 532 nm 304, and 635 nm 306 is at or less than $1\times10^{-2}$, representing an optical density of two, or OD2, which is sufficient to prevent laser dazzle in a user wearing the eyewear from a laser beam illuminating the face of the user.

In addition, the laser protection eyewear of various embodiments of the present teaching can provide blocking for incident laser light over an input angle of approximately ±30 degrees from the normal to the lens. Typically, handheld high-power lasers have a beam spread between 1 and 3 mradian, and the range for an applied power of 0.25 Lux is 6-9 kilometers. These lasers pose a particularly high threat to aircraft pilots. Fixed-wing aircraft are especially vulnerable during landing and takeoff, at elevations of less than 1 km. Similarly, rotary-wing aircraft are especially vulnerable as they hover anywhere between 0.1 and 1 km during operations such as traffic monitoring and public safety operations by law enforcement and other government agencies, such as the Federal Emergency Management Agency (FEMA) and the National Forest Service. Often, in the case of deliberate nefarious laser flashing of aircraft, the laser operator will typically be intentionally located at a substantial distance from the position of the aircraft so that it is difficult to track the person after the flashing incident.

Figure 4:
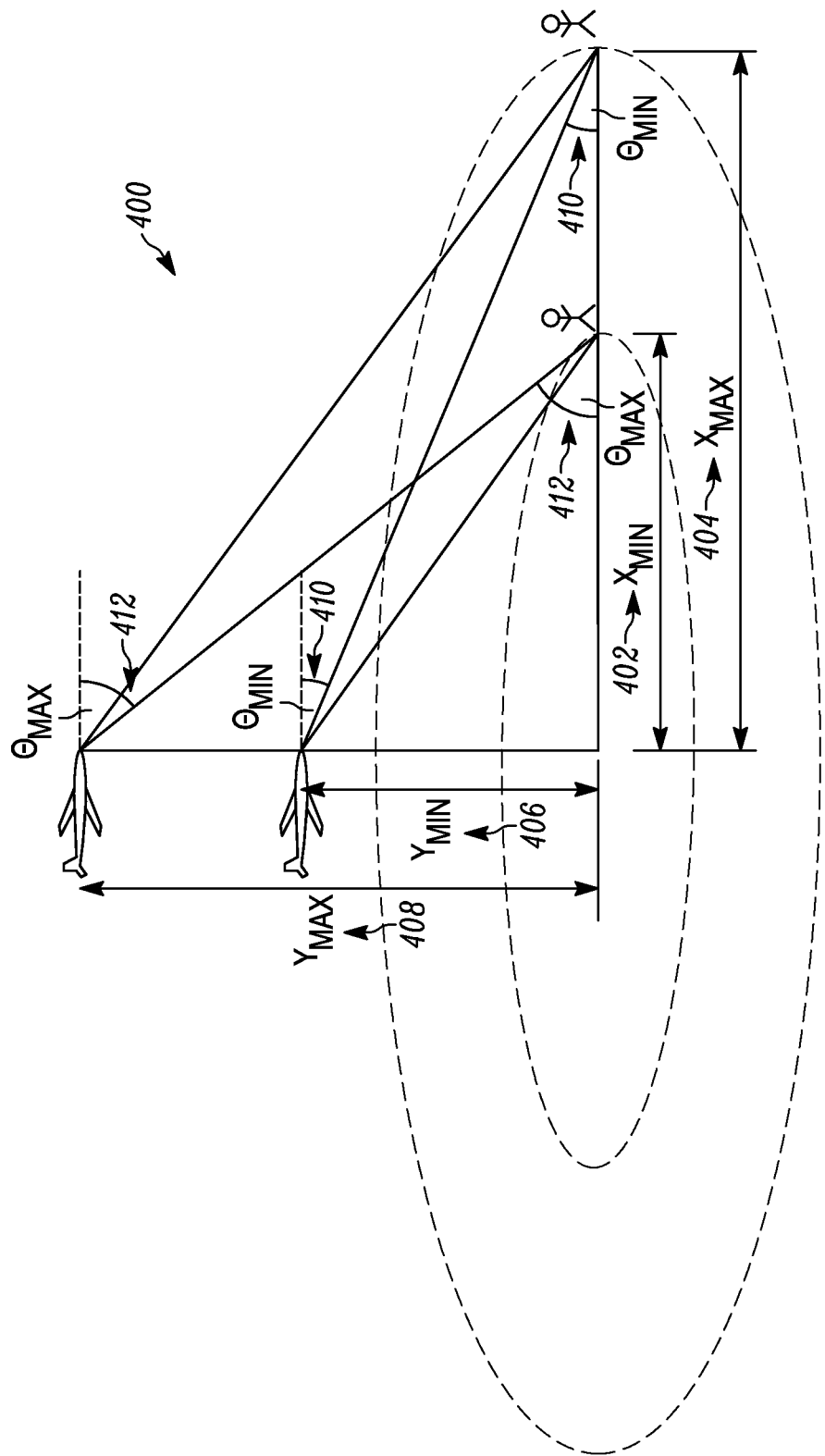
FIG. 4 illustrates a schematic diagram representing the geometry of the angle of attack for a laser illumination of aircraft.

FIG. 4 illustrates a schematic diagram representing the geometry of the angle of attack for a laser illumination of aircraft 400. Specifically referring to FIG. 4, if the laser operator is within a range of distances from $X_{min}$ 402 to $X_{max}$ 404, from the latitude and longitude of the aircraft, and the aircraft is at an altitude between $Y_{min}$ 406 and $Y_{max}$ 408, then the minimum angle of attack, $\theta_{MIN}$, 410 is ATAN ($Y_{min}/X_{max}$) and the maximum angle, $\theta_{MAX}$, 412 is ATAN ($Y_{max}/X_{min}$). For example, for $X_{min}$=0.5 km, $X_{max}$=1.5 km, $Y_{min}$=0.1 km, and $Y_{max}$=1 km, $\theta_{MIN}$=4 degrees and $\theta_{MAX}$=63 degrees. Thus, the large distance between the laser operator and the aircraft somewhat limits the range of angles of attack in the vertical direction. In most aircraft, however, the angle of attack is further limited by the size of the widow in the cockpit.

The CIE colorimetric system includes methods to predict the magnitude of a perceived color difference between two given color stimuli. This color difference comparison as applied to the spectrally filtered eyewear of the present teaching is performed between the color stimuli of the object (scene, screen, or other object being viewed by the user) as viewed without the spectrally filtered eyewear to that viewed through the eyewear. The color stimuli of an object viewed through the eyewear is the object color stimuli multiplied by the interference filter transmission function. In practice, the color stimuli of the object are multiplied with the spectral transmittance function of the interference filter transmission function at each spectral frequency.

Figure 5:
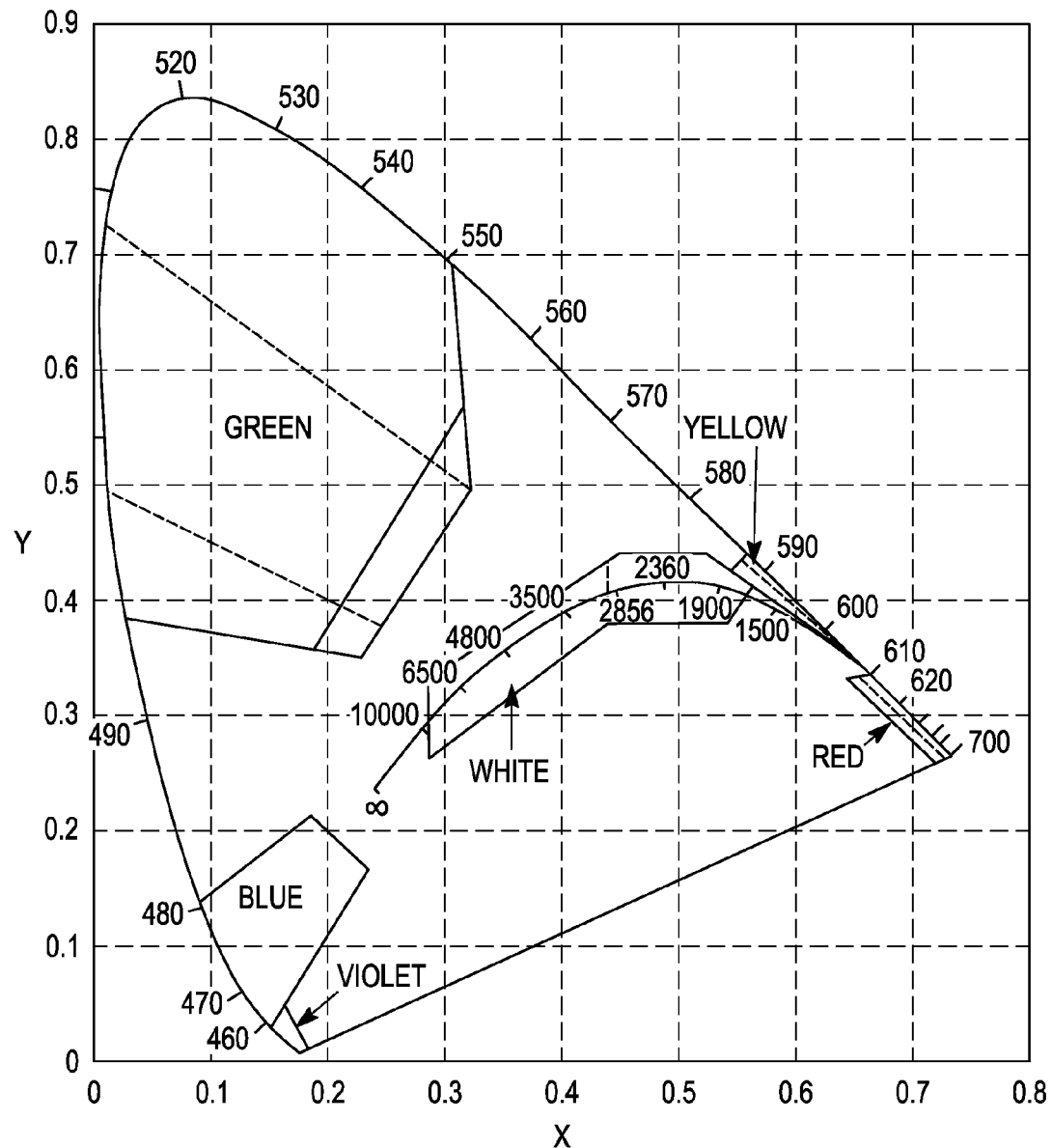
FIG. 5 illustrates a color space chromaticity diagram of the transmittance, front reflectance, and back reflectance of an embodiment of the filtered eyewear of the present teaching.

As presented in Wyszecki and Styles, *Color Science*, John Wiley & Sons, 2000 (hereinafter "Wyszecki"), which is incorporated herein by reference, there are standard colorimetric formulae and methods for establishing color difference and color contrast. FIG. 5 illustrates the CIE 1931 (x,y) chromaticity diagram that shows the recommended chromaticity zones for signal lights, including green, yellow, red, blue, violet and white color signal lights. See Wyszecki p. 222-223. The chromaticity zones for each color illustrate represent the regions of color stimuli that would be recognized for their color by non-color-vision impaired human observers.

As described in Wyszecki p. 164-222, there are various color difference formulations that are used for different kinds of color stimulation. In 1976, CIE adopted the CIE-LUV color space, a simple transformation of the 1931 CIE XYZ color space that is widely used for computer graphics and colored light color difference purposes. In this CIELUV formulation, the color difference between two color stimuli presented in terms of L*, u*, and v*, is given by (see Wyszecki p. 165-166):

$$\Delta E_{uv}* = [(\Delta L^*)^2 + (\Delta u^*)^2 + (\Delta v^*)^2]^{1/2}$$

One aspect of the present teaching is to provide laser protection eyewear that can pass the traffic light transmission requirements as set out in American National Standard Institute (ANSI) Standard for Ophthalmics-Nonprescription Sunglass and Fashion Eyewear Requirements, ANSI Z80.3-2010, which is herein referred to as the "ANSI Standard". In Section 4.6.3, the ANSI Standard indicates that the luminous transmittance of lenses used for driving or other activities requiring traffic signal recognition shall comply with the following: (1) luminous transmittance greater than or equal to 8%; and (2) transmittance of the traffic signal through the lens shall be red signals ≥8%, yellow signals ≥6%, and green signals ≥6%.

Another aspect of the present teaching is to provide laser protection eyewear that allows the eyewear user to observe various computer and other illuminated flat-panel screen devices in the cockpit or instrumentation region. The department of transportation (DOT) document, DOT/FAA/TC-07/11, entitled "Human Factors Criteria for Displays: A Human Factors Design Standard Update of Chapter 5," discusses the display criteria for interaction with displays of computer generated information in FAA operating environments. In particular, this DOT document includes color characteristics of visual displays, and considers particular sets guidelines for color characteristics in situations where absolute color classification is necessary. Specifically, the DOT document states that "color contrast should be greater than 40 $\Delta E_{Y_{u'v'}}$ if absolute color classification is necessary, and 100 $\Delta E_{Y_{u'v'}}$ if relative color classification is necessary." The color difference in the ANSI standard is provided in terms of the CIEYUV color space and is related to the CIELUV space by the transformation: $Y=25L^{*3}$, $u'=u^*$, $v'=3/2\ v^*$.

Thus, some embodiments of the laser protective eyewear according to the present teaching provide a filtered optical transmission spectrum to the user viewing computer and other illuminated flat-panel screen display devices in the cockpit through the eyewear lens that meets the DOT criteria. These flat-panel screen displays include cockpit instrumentation, handheld, and laptop devices used in conjunction with flight operations, and other cockpit displays, lightings for alerts, notifications, and other indicator lights. In some embodiments, the laser protection eyewear transmittance spectra will maintain color difference for illumination sources that pass through the lens to the user of greater than 40 $\Delta E_{Y_{u'v'}}$ for situations in which a pilot must discriminate indicator light color, such as red, yellow and green lights on runways and in the cockpit. In some embodiments, the laser protection eyewear according to the present teaching has a transmittance spectra that maintains color difference for illumination sources that pass through the lens to the user of greater than 100 $\Delta E_{Y_{u'v'}}$ if relative color contrast must be maintained to ensure safe operation of the aircraft.

Figure 6:
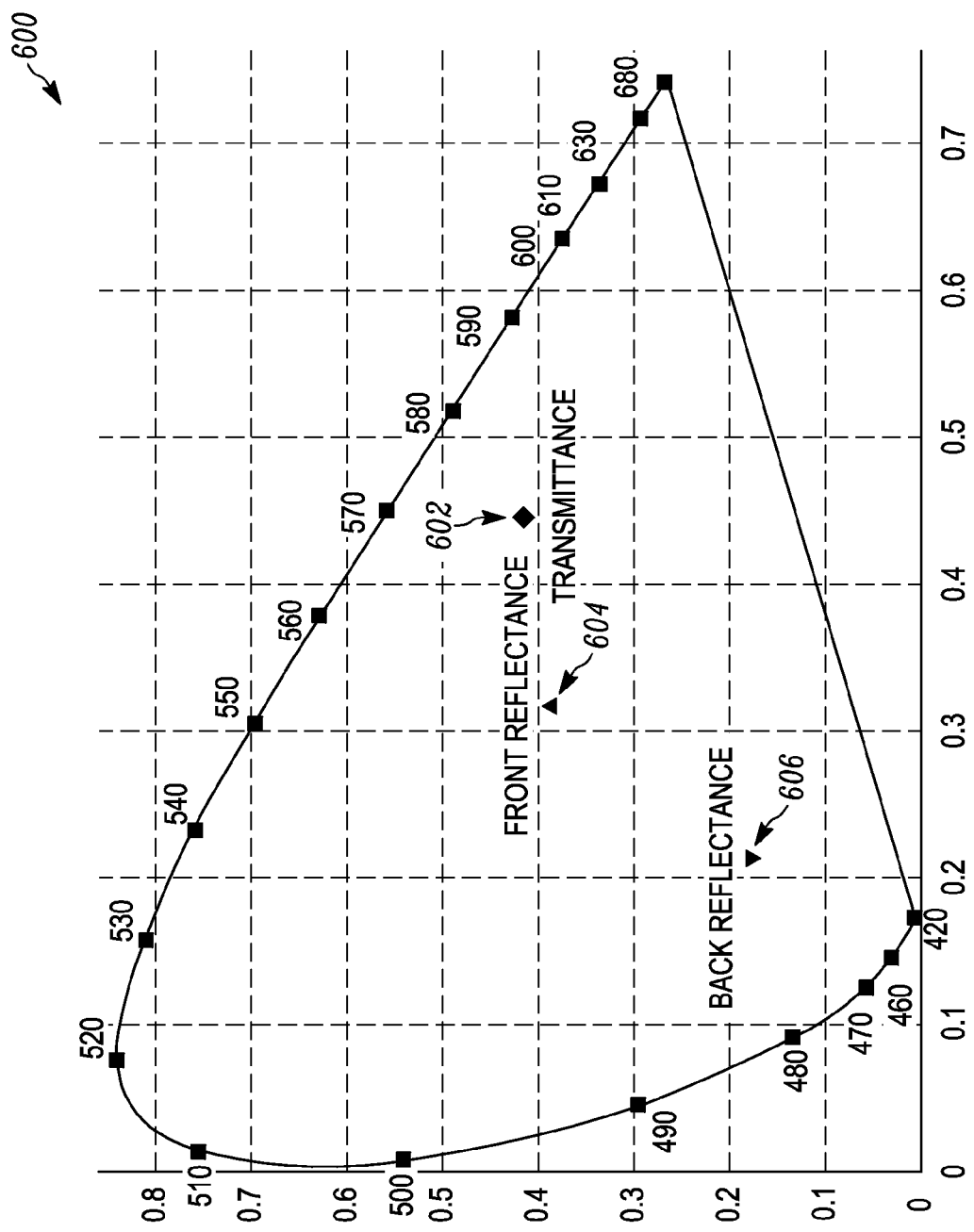
FIG. 6 illustrates the CIE 1931 (x,y) chromaticity diagram that includes recommended chromaticity domains for signal lights.

FIG. 6 illustrates a CIE 1931 (x,y) color space chromaticity diagram of the transmittance, front reflectance, and back reflectance of an embodiment of the filtered eyewear of the present teaching. Transformation between the CIE 1931 (x,y) color space representations and the CIELUV, or equivalently CIE 1976 (L*,u*,v*), color space are found, for example, in Wyszecki p. 165-166. In some embodiments, the transmittance of the lens is greater than or equal to 55% and the chromaticity is (0.43, 0.41) 602. This chromaticity provides the user a pleasant amber-color-filter for light passing through the lens. In some embodiments, the filtered eyewear presents a front reflectance 604 with a greenish-yellow color. In some embodiments, the color of the front reflectance may be engineered into the spectral profile of the multilayer interference filter or filters applied to the surfaces of the eyewear lens to provide a particular color that may be associated with the market brand of the product.

The back reflectance of eyewear can cause illumination from behind a user's head to be undesirably reflected into the user's eye. Back reflectance can also result in an undesirable reflection of an image of the user's eye and eye socket back into the user's visual field. The back reflectance from the laser protection eyewear of the present teaching occurs because there is a cumulative reflectance from the multilayer filters that is applied to either the front or back surface of the lens substrate or that is applied to both surfaces.

The amount of the back reflected light is also affected by the transmission through the lens substrate. As such, the amount of back reflected light can be minimized by reducing the transmission through the lens for all values of the spectrum by using a substrate with a spectrally-neutral density filter. In some embodiments of eyewear according to the present teaching, the back reflectance is less than 20%. In one aspect of the present teaching, the color of the back reflected light can be engineered by tailoring the spectral filter profiles of the multilayer interference filters applied to the front and/or back surfaces of the lens. For example, in one particular embodiment, the back reflectance chromaticity is a deep blue color, (0.21, 0.16) 606 as shown in FIG. 6. Also, in some embodiments, the color of the back reflectance is chosen to minimize distraction. Also, in some embodiments, the color of the back reflectance is chosen to provide a color associated with the particular market brand of the eyewear. Furthermore, in some embodiments, the back reflectance color is chosen to provide a sense of well-being for the eyewear user.

Yet another aspect of the laser protection eyewear of the present teaching is that it can provide a spectral filter profile that can improve the visual acuity of the eyewear user. Air Force Research Laboratory document, AFRL-HE-BR-TR-2005-0134, entitled "Physchophysical Test of Contrast Acuity to Aid Operational Effectiveness of Aircrew Laser Eye Protection (LEP)," which is incorporated herein by reference, provides data from a scientific study of acuity of airmen viewing a variety of media (paper, LED and CRT displays), under a variety of optical filter conditions. Data presented from this document relating to an improvement in the visual acuity is described in connection with FIG. 7.

Figure 7:
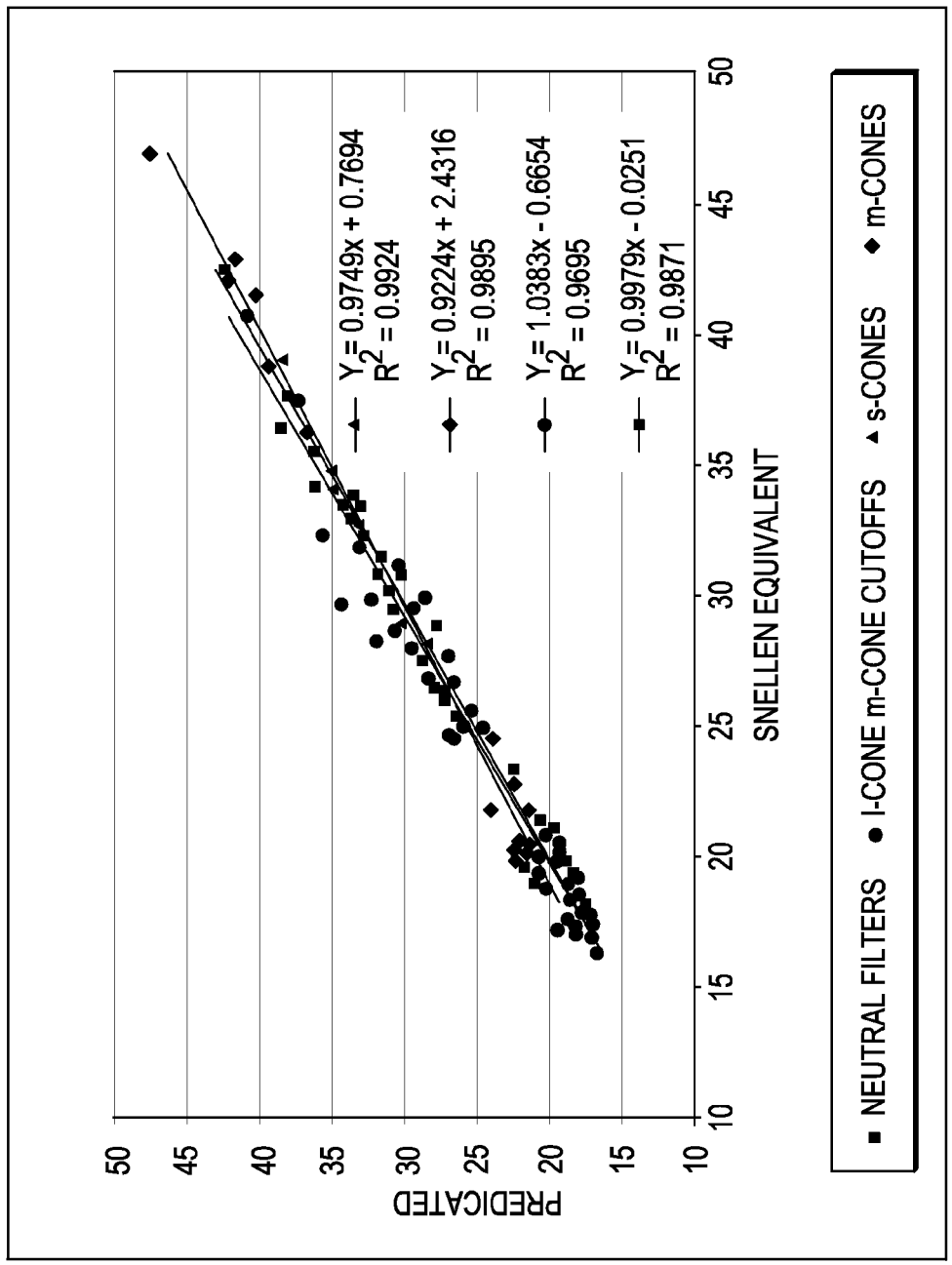
FIG. 7 illustrates a plot of the predicted and measured Snellan equivalents for individuals viewing through various filters that pass light detected by l-cones, m-cones, and s-cones.

FIG. 7 illustrates a plot of the predicted and measured Snellan equivalents for individuals viewing through various filters that pass light detected by l-cones, m-cones, and s-cones. The data of FIG. 7 illustrate that filters favoring l-cones that pass more yellow light, but block green light, which are shown as squares in the data of FIG. 7, demonstrate an improvement in acuity when compared with filters favoring m-cones or s-cones that block yellow and pass blue and green light, which are shown as triangles and diamonds in the data of FIG. 7.

Certain embodiments of the laser eyewear according to the present teaching are designed to provide transmission that favors light that stimulates the l-cones, while reducing the light that stimulates m-cones or s-cones, and blocking a narrow band of wavelengths around 532 nm for laser protection purposes. These embodiments of the laser protection eyewear provide an improvement of visual acuity under particular viewing conditions, while providing the desired protection from certain dangerous wavelengths of laser radiation.

It is another aspect of the present teaching to provide laser protection eyewear in the form of contact lenses that provides for good peripheral vision. There have been numerous recent laser illumination events at sporting events, in particular flashing green lasers at soccer players and football players during games, which indicate a need for laser protective eyewear for athletes. One important aspect of vision for athletes is the ability to have accurate, and unobstructed peripheral vision. Because the lenses of glasses and goggles worn on the head sit at some distance from the eye, this kind of eyewear that is affixed to the user by frames, visors, helmets, or other apparatus does not afford protection at large peripheral angles, and also can obstruct the user's peripheral vision. Contact lenses, being worn directly on the lens of the eye can significantly improve the protection from laser radiation at large peripheral angles.

Contact lenses according to the present teaching can be hard or soft contact lenses formed of numerous materials known in the art, including polymethyl methacrylate (PMMA) or plastic hydrogels. In some embodiments of contact lenses according to the present teaching interference filters are applied directly to one or both surfaces of the contact lenses. These interference filters can be formed of a single or multi-layer coating of dielectric materials, such as a silicon oxide, tantalum oxide, and titanium oxide. In various embodiments, multilayer interference coating applied to one side of the contact lens. Other embodiments coat both sides of the contact lens.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A laser protection lens comprising a multilayer interference coating applied to at least one of an inside and an outside surface of an optically transparent material, the multilayer interference coating having a spectral filter profile with at least a 20 dB reduction of optical transmission for at least two different center wavelengths of lasers with a 3 dB bandwidth around the at least two center frequencies that is less than about 30 nm, while having a transmittance color difference greater than 40 $\Delta E_{u'v'}$, for discrimination color difference of red, green and yellow indicator lights, and having spectral transmittance that passes light detected by l-cones of an eye, while attenuating light detected by m-cones and s-cones of the eye so as to improve visual acuity.

2. The laser protection lens of claim 1 wherein the at least two different center wavelengths of the lasers are selected from the group consisting of approximately 445 nm, 532 nm, and 635 nm.

3. The laser protection lens of claim 1 wherein the multilayer interference coating presents an amber color to the user.

4. The laser protection lens of claim 1 wherein the multilayer interference coating presents a back reflection that is less than or equal to 20%.

5. The laser protection lens of claim 4 wherein the multilayer interference coating is designed to provide an amber color back reflection.

6. The laser protection lens of claim 1 wherein the multilayer interference coating is formed on both an inside and an outside surface of the optically transparent material.

7. The laser protection lens of claim 6 wherein a thickness of the multilayer interference coating on at least one of the inside and the outside surfaces of the optically transparent material is chosen to reduce at least one of compressive and tensile forces.

8. The laser protection lens of claim 1 wherein the optically transparent material is selected from the group consisting of glass, quartz, plastic, polycarbonate, PMMA and CR39.

9. The laser protection lens of claim 1 wherein the optically transparent material has optical transmission greater than 90% over a portion of the visible spectrum.

10. The laser protection lens of claim 1 wherein a total thickness of the multilayer interference coating is less than or equal to 5 microns.

11. The laser protection lens of claim 1 further comprising at least one additional coating applied to at least one of the inside and the outside surface of the optically transparent material, the additional coating being selected from the group consisting of scratch resistance, UVA/UVB blocking, shatter resistance, anti-static, polarizing, glare reduction, anti-reflection, sun protection, and darkness contrast enhancement.

12. The laser protection lens of claim 1 wherein the laser protection lens comprises a prescription lens.

13. The laser protection lens of claim 1 wherein the multilayer interference coating provides a spectral filter profile that enhances a user's color perception of illuminated displays.

14. The laser protection lens of claim 13 wherein the illuminated displays are selected from a group consisting of cockpit instrumentation displays, LCD displays, plasma displays, cell phone/smartphone displays, tablet displays, computer displays, and laptop displays.

15. The laser protection lens of claim 1 wherein the multilayer interference coating provides a spectral filter profile that enhances a user's viewability of a head-up display.

16. The laser protection lens of claim 1 wherein the multilayer interference coating provides a spectral filter profile that enhances a user's night vision.

17. The laser protection lens of claim 1 wherein the multilayer interference coating provides a spectral filter profile that enhances a user's viewability when using cockpit night vision equipment.

18. The laser protection lens of claim 1 wherein the spectral filter profile allows a transmittance of traffic signals through the lens that comprises red signals ≥8%, yellow signals ≥6%, and green signals ≥6%.

19. A laser protection contact lens comprising a multilayer interference coating applied to at least one of an inside and an outside surface of an optically transparent material, the multilayer interference coating having a spectral filter profile with at least a 20 dB reduction of optical transmission for at least two different center wavelengths of lasers with a 3 dB bandwidth around the at least two center frequencies that is less than about 30 nm, while having a transmittance color difference greater than 40 $\Delta E_{u'v'}$ for discrimination color difference of red, green and yellow indicator lights, and having spectral transmittance that passes light detected by l-cones of an eye, while attenuating light detected by m-cones and s-cones of the eye so as to improve visual acuity.

20. The laser protection contact lens of claim 19 wherein the contact lens comprises a hard contact lens.

21. The laser protection contact lens of claim 19 wherein the contact lens comprises a soft contact lens.

22. The laser protection lens of claim 19 wherein the at least two different center wavelengths of lasers are selected from the group consisting of approximately 445 nm, 532 nm, and 635 nm.

23. The laser protection lens of claim 19 wherein the multilayer interference coating presents an amber color to the user.

24. The laser protection lens of claim 19 wherein the multilayer interference coating presents a back reflection that is less than or equal to 20%.

25. The laser protection lens of claim 24 wherein the multilayer interference coating is designed to provide an amber color back reflection.

26. The laser protection lens of claim 19 wherein the multilayer interference coating is formed on both an inside and an outside surface of the optically transparent material.

27. The laser protection lens of claim 26 wherein a thickness of the multilayer interference coating on at least one of the inside and the outside surfaces of the optically transparent material is chosen to reduce at least one of compressive and tensile forces.

28. The laser protection lens of claim 19 wherein the optically transparent material has optical transmission greater than 90% over a portion of the visible spectrum.

29. The laser protection lens of claim 19 wherein a total thickness of the multilayer interference coating is less than or equal to 5 microns.

30. The laser protection lens of claim 19 further comprising at least one additional coating applied to at least one of the inside and the outside surface of the optically transparent material, the additional coating being selected from the group consisting of UVA/UVB blocking, polarizing, glare reduction, and anti-reflection.

31. The laser protection lens of claim 19 wherein the laser protection lens comprises a prescription lens.

32. The laser protection lens of claim 19 wherein the multilayer interference coating provides a spectral filter profile that enhances a user's color perception of illuminated displays.

33. The laser protection lens of claim 32 wherein the illuminated displays are selected from a group consisting of cockpit instrumentation displays, LCD displays, plasma displays, cell phone/smartphone displays, tablet displays, computer displays, and laptop displays.

34. The laser protection lens of claim 19 wherein the multilayer interference coating provides a spectral filter profile that enhances a user's viewability of a head-up display.

35. The laser protection lens of claim 19 wherein the multilayer interference coating provides a spectral filter profile that enhances a user's night vision.

36. The laser protection lens of claim 19 wherein the multilayer interference coating provides a spectral filter profile that enhances a user's viewability when using cockpit night vision equipment.

37. The laser protection lens of claim 19 wherein the spectral filter profile allows transmittance of traffic signals through the lens that comprises red signals ≥8%, yellow signals ≥6%, and green signals ≥6%.

38. A laser protection lens comprising a multilayer interference coating applied to both an inside and an outside surface of an optically transparent material, a thickness of the multilayer interference coating on at least one of the inside and the outside surfaces of the optically transparent material being chosen to reduce at least one of compressive and tensile forces, the multilayer interference coating having a spectral filter profile with at least a 20 dB reduction of optical transmission for at least two different center wavelengths of lasers, while having a transmittance color difference greater than 40 $\Delta E_{Y_{u'v'}}$ for discrimination color difference of red, green and yellow indicator lights, and having spectral transmittance that passes light detected by l-cones of an eye, while attenuating light detected by m-cones and s-cones of the eye so as to improve visual acuity.

39. The laser protection lens of claim 38 wherein a 3 dB bandwidth around the at least two center frequencies is less than about 30 nm.

40. The laser protection lens of claim 38 wherein the at least two different center wavelengths of the lasers are selected from the group consisting of approximately 445 nm, 532 nm, and 635 nm.

41. The laser protection lens of claim 38 wherein the multilayer interference coating presents an amber color to the user that promotes a feeling of well-being.

42. The laser protection lens of claim 38 wherein the multilayer interference coating presents a back reflection that is less than or equal to 20%.

43. The laser protection lens of claim 42 wherein the multilayer interference coating is designed to provide an amber colored back reflection.

44. The laser protection lens of claim 38 wherein the optically transparent material is selected from the group consisting of glass, quartz, plastic, polycarbonate, PMMA and CR39.

45. The laser protection lens of claim 38 wherein the optically transparent material has optical transmission greater than 90% over a portion of the visible spectrum.

46. The laser protection lens of claim 38 wherein a total thickness of the multilayer interference coating is less than or equal to 5 microns.

47. The laser protection lens of claim 38 further comprising at least one additional coating applied to at least one of the inside and the outside surface of the optically transparent material, the additional coating being selected from the group consisting of scratch resistance, UVA/UVB blocking, shatter resistance, anti-static, polarizing, glare reduction, anti-reflection, sun protection, and darkness contrast enhancement.

48. The laser protection lens of claim 38 wherein the laser protection lens comprises a prescription lens.

49. The laser protection lens of claim 38 wherein the multilayer interference coating provides a spectral filter profile that enhances a user's color perception of illuminated displays.

50. The laser protection lens of claim 49 wherein the illuminated displays are selected from a group consisting of cockpit instrumentation displays, LCD displays, plasma displays, cell phone/smartphone displays, tablet displays, computer displays, and laptop displays.

51. The laser protection lens of claim 38 wherein the multilayer interference coating provides a spectral filter profile that enhances a user's viewability of a head-up display.

52. The laser protection lens of claim 38 wherein the multilayer interference coating provides a spectral filter profile that enhances a user's night vision.

53. The laser protection lens of claim 38 wherein the multilayer interference coating provides a spectral filter profile that enhances a user's viewability when using cockpit night vision equipment.

54. The laser protection lens of claim 38 wherein the spectral filter profile allows a transmittance of traffic signals through the lens that comprises red signals 8%, yellow signals 6%, and green signals 6%.

55. A laser protection contact lens comprising a multilayer interference coating applied to both an inside and an outside surface of an optically transparent material, a thickness of the multilayer interference coating on at least one of the inside and the outside surfaces of the optically transparent material being chosen to reduce at least one of compressive and tensile forces, the multilayer interference coating having a spectral filter profile with at least a 20 dB reduction of optical transmission for at least two different center wavelengths of lasers, while having a transmittance color difference greater than 40 $\Delta E_{Y_{u'v'}}$ for discrimination color difference of red, green and yellow indicator lights, and having spectral transmittance that passes light detected by l-cones of an eye, while attenuating light detected by m-cones and s-cones of the eye so as to improve visual acuity.

56. The laser protection lens of claim 55 wherein a 3 dB bandwidth around the at least two center frequencies is less than about 30 nm.

57. The laser protection lens of claim 55 wherein the at least two different center wavelengths of the lasers are selected from the group consisting of approximately 445 nm, 532 nm, and 635 nm.

58. The laser protection lens of claim 55 wherein the multilayer interference coating presents an amber color to the user.

59. The laser protection lens of claim 55 wherein the multilayer interference coating presents a back reflection that is less than or equal to 20%.

60. The laser protection lens of claim 59 wherein the multilayer interference coating is designed to provide an amber color back reflection.

61. The laser protection lens of claim 55 wherein the optically transparent material is selected from the group consisting of glass, quartz, plastic, polycarbonate, PMMA and CR39.

62. The laser protection lens of claim 55 wherein the optically transparent material has optical transmission greater than 90% over a portion of the visible spectrum.

63. The laser protection lens of claim 55 wherein a total thickness of the multilayer interference coating is less than or equal to 5 microns.

64. The laser protection lens of claim 55 further comprising at least one additional coating applied to at least one of the inside and the outside surface of the optically transparent material, the additional coating being selected from the group consisting of scratch resistance, UVA/UVB blocking, shatter resistance, anti-static, polarizing, glare reduction, anti-reflection, sun protection, and darkness contrast enhancement.

65. The laser protection lens of claim 55 wherein the laser protection lens comprises a prescription lens.

66. The laser protection lens of claim 55 wherein the multilayer interference coating provides a spectral filter profile that enhances a user's color perception of illuminated displays.

67. The laser protection lens of claim 66 wherein the illuminated displays are selected from a group consisting of cockpit instrumentation displays, LCD displays, plasma displays, cell phone/smartphone displays, tablet displays, computer displays, and laptop displays.

68. The laser protection lens of claim 55 wherein the multilayer interference coating provides a spectral filter profile that enhances a user's viewability of a head-up display.

69. The laser protection lens of claim 55 wherein the multilayer interference coating provides a spectral filter profile that enhances a user's night vision.

70. The laser protection lens of claim 55 wherein the multilayer interference coating provides a spectral filter profile that enhances a user's viewability when using cockpit night vision equipment.

71. The laser protection lens of claim 55 wherein the spectral filter profile allows a transmittance of traffic signals through the lens that comprises red signals ≥8%, yellow signals ≥6%, and green signals ≥6%.

\* \* \* \* \*